United States Patent [19]
Tatemoto et al.

[11] Patent Number: 4,575,115
[45] Date of Patent: Mar. 11, 1986

[54] VEHICLE HEIGHT CONTROL SYSTEM

[75] Inventors: Minoru Tatemoto; Mitsuhiko Harara, both of Okazaki, Japan

[73] Assignees: Mitsubishi Jidosha Kogyo K.K.; Mitsubishi Denki K.K., Both of Tokyo, Japan

[21] Appl. No.: 610,329

[22] Filed: May 15, 1984

[30] Foreign Application Priority Data

May 20, 1983 [JP] Japan .............................. 58-75443[U]

[51] Int. Cl.[4] ............................................ B60G 11/26
[52] U.S. Cl. .................................. 280/707; 280/6.1; 280/DIG. 1; 340/52 R
[58] Field of Search .............. 280/707, 6 R, 6 H, 6.1, 280/DIG. 1; 180/41; 340/52 R

[56] References Cited
U.S. PATENT DOCUMENTS

| | | | |
|---|---|---|---|
| 4,162,083 | 7/1979 | Zabler et al. | 280/707 |
| 4,361,346 | 11/1982 | Harris | 280/707 |
| 4,391,452 | 7/1983 | Ohmori | 280/707 |
| 4,401,310 | 8/1983 | Ishikawa et al. | 280/707 |

Primary Examiner—Joseph F. Peter, Jr.
Assistant Examiner—Kenneth R. Rice
Attorney, Agent, or Firm—Robert E. Burns; Emmanuel J. Lobato; Bruce L. Adams

[57] ABSTRACT

A vehicle height control system capable, even if the height of the front side of the vehicle body is raised during the preceding vehicle height control operation by the agency of starting acceleration and the inertia of the body, and thereby the preceding vehicle height control operation for the front side is completed and the height of the front side is lowered thereafter due to the transition of the running mode of the vehicle from an accelerating mode to a constant-speed running mode, of advancing the timing of initiation of the succeeding vehicle height control operation to adjust the height of the front side to a standard height.

The vehicle height control system is provided with a vehicle height control operation initiating device which gives a vehicle height control operation initiating signal to initiate vehicle height control operation to adjust the vehicle height to the standard vehicle height, when the vehicle height determined during a set vehicle height judging time interval is different from the standard vehicle height.

The system is provided further with a vehicle height control operation initiating timing advancing device which sets in the vehicle height control operation initiating device a reduced vehicle height judging time interval which is shorter than the ordinary vehicle height judging time interval, when vehicle height control operation which has been initiated while the vehicle is running at a speed of a set value or below is completed while the vehicle is running at a speed over the set value.

6 Claims, 8 Drawing Figures

FIG. I
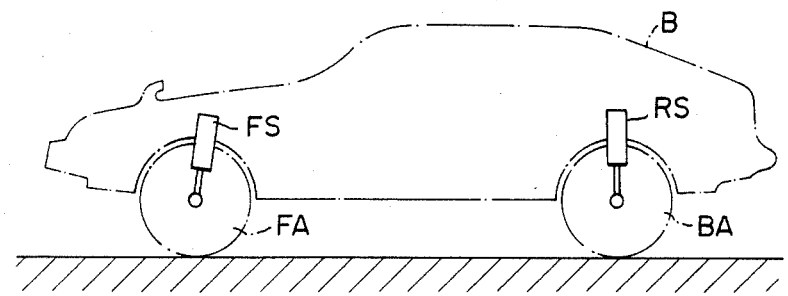
FIG. 3
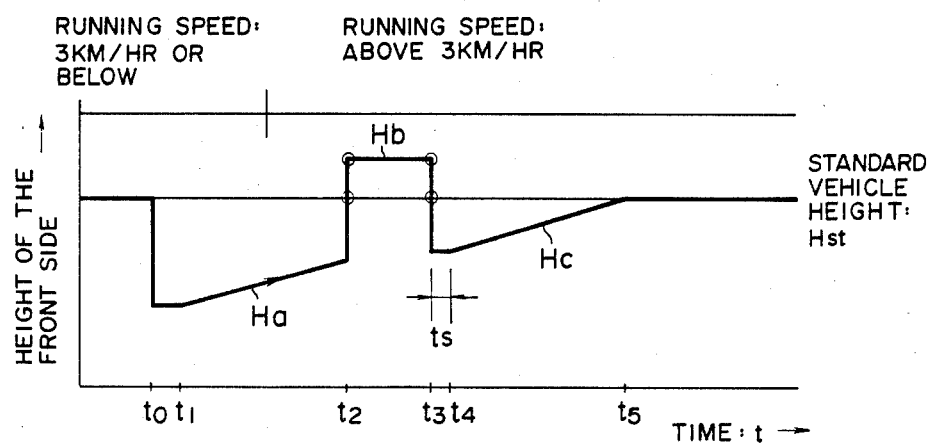

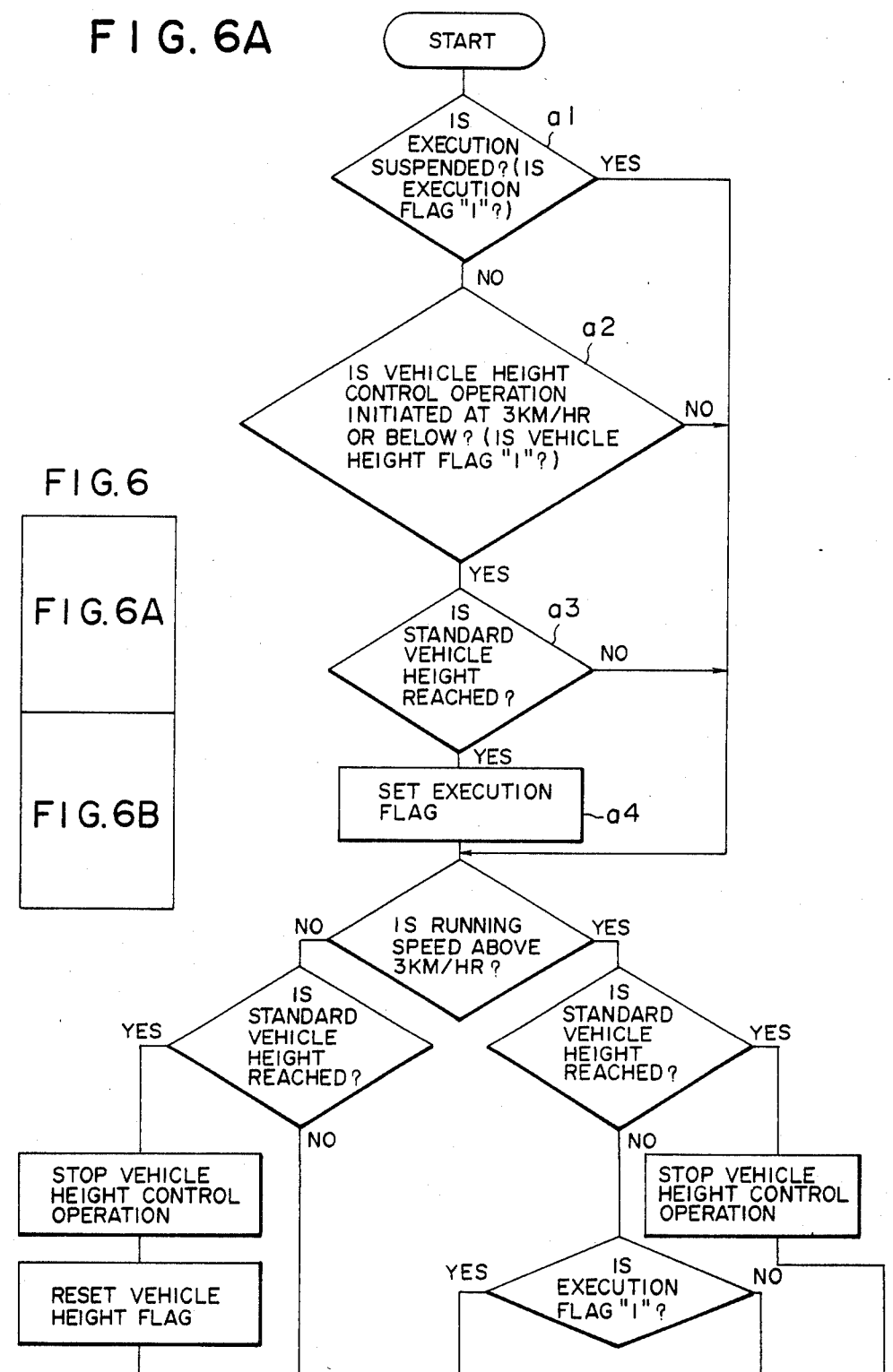

VEHICLE HEIGHT CONTROL SYSTEM

BACKGROUND OF THE INVENTION

1. Field of the Invention

The present invention relates to a vehicle height control system having an improved control means controlling vehicle height at the start of the vehicle.

2. Description of the Prior Art

According to the conventional system, vehicle height at the start of the vehicle is controlled in the following procedure. Usually, the height of a vehicle is detected and vehicle height adjustment is started upon the lowering of the vehicle height owing to the boarding of passengers. A vehicle height judging time for deciding whether or not vehicle height adjustment should be carried out is set beforehand. That is, a vehicle height judging time for starting is comparatively short so that a target vehicle height can be restored quickly even if the vehicle height varies due to the alighting and boarding of passengers while the vehicle is stopping, while a vehicle height judging time for running is longer than the vehicle height judging time for starting to obviate frequent vehicle height adjustment at every temporary variation of the attitude of the vehicle resulting from running on an irregular road, or acceleration or deceleration of the vehicle. On the other hand, vehicle height adjusting operation is stopped as soon as the vehicle height has reached the target vehicle height so that the vehicle height will not exceed the target vehicle height.

If the vehicle is started and accelerated in course of vehicle height adjusting operation, the front side of the vehicle is raised by the inertial force over the target vehicle height, and thereby the vehicle height adjustment for the front side is interrupted. Consequently, the front side lowers of itself after the starting acceleration has been completed and the running mode has been transferred to a constant-speed running mode, and hence the height of the front side becomes lower than the target vehicle height.

Since the vehicle height judging time for running is comparatively long to obviate the frequent vehicle height adjustment during running as noted above, the vehicle is obliged to run for a long time with the front side dipping even after the transition of the running mode from acceleration to constant-speed running and it takes long time to make the vehicle height of the front side coincide with the target vehicle height, when the vehicle is started to run with the front side dipping.

SUMMARY OF THE INVENTION

Accordingly, the present invention has been made to solve the above-mentioned inconvenience and it is an object of the present invention to provide a vehicle height control system capable of restoring a target vehicle height quickly by reducing the vehicle height judging time for deciding the next vehicle height adjustment should be carried out in case that the initial vehicle height adjustment has been started at a running speed of the predetermined running speed or below and completed at a running speed over said predetermined running speed owing to the start and acceleration of the vehicle.

According to the present invention, even if the front side of a vehicle is raised during vehicle height adjusting operation due to the start and acceleration of the vehicle, vehicle height adjusting operation to restore the target vehicle height is performed again within a short period of time after the completion of acceleration and the establishment of the constant-speed running mode, so that vehicle height adjustment is attained quickly and stable running of the vehicle is secured.

BRIEF DESCRIPTION OF THE DRAWINGS

FIG. 1 is a typical illustration of an automobile equipped with a vehicle height control system according to the present invention;

FIG. 3 is a timing diagram showing the relation between vehicle height and running speed;

FIGS. 6, 6A and 6B are a flow chart showing the functions of the vehicle height control system according to the present invention.

DETAILED DESCRIPTION OF THE PREFERRED EMBODIMENTS

The first embodiment of the present invention will be described in connection with FIGS. 1 to 4.

Referring to FIG. 1, front air-suspension units FS (FS1 and FS2) are interposed between opposite ends of a front axle for front wheels FA and the members on the side of a vehicle body B, while rear air-suspension units RS (RS1 and RS2) are interposed between the opposite ends of the rear axle for rear wheels BA and the members on the side of the vehicle body B, respectively.

Figure 2:
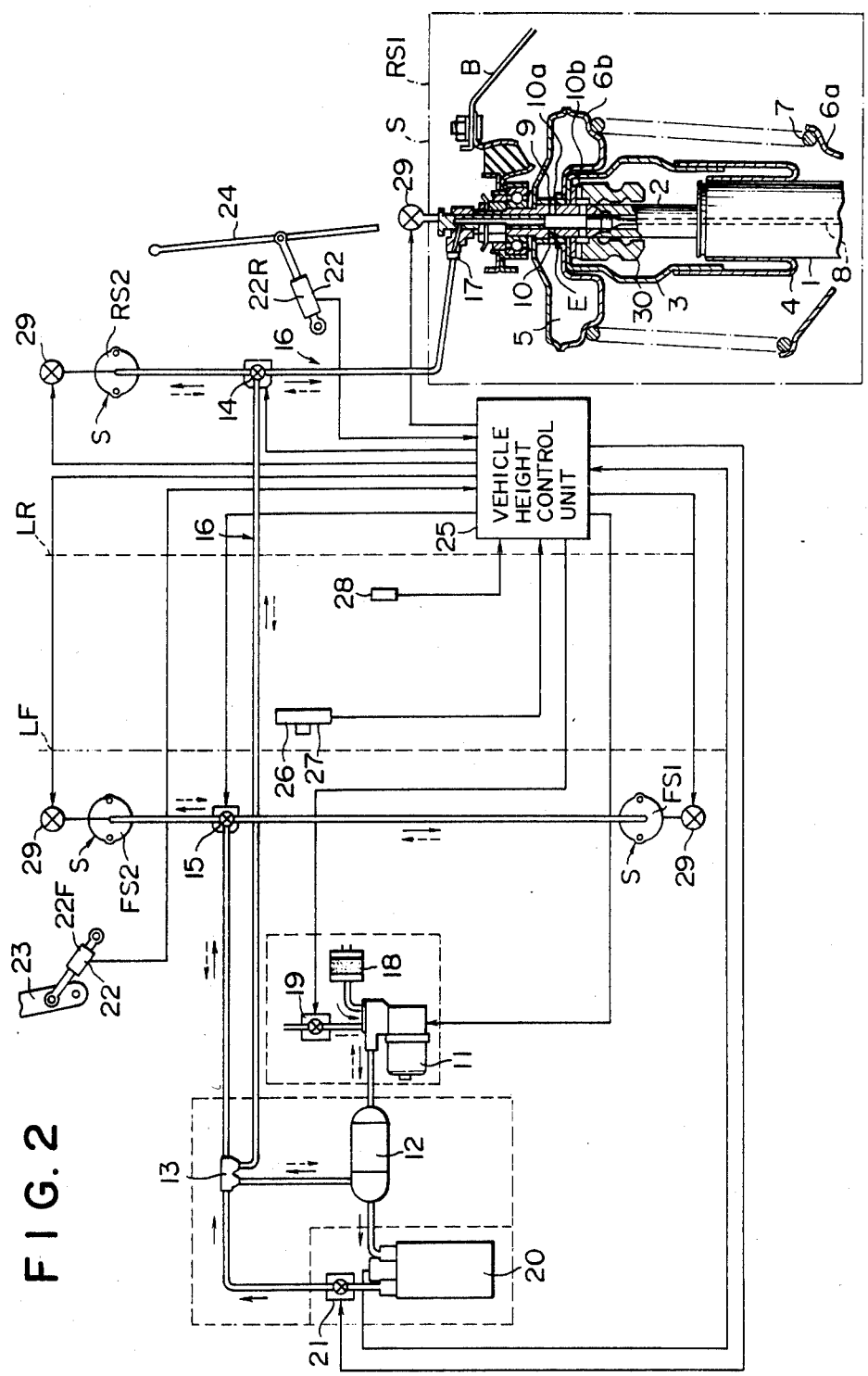
FIG. 2 is a diaagrammatic illustration showing the general constitution of a vehicle height control system embodying the present invention.

Since the respective constructions of these air-suspension units FS1, FS2, RS1 and RS2 are nearly the same, the air-suspension units will be designated inclusively by a reference character "S" as shown in FIG. 2, except when it is necessary to discriminate the front air-suspension units from the rear air-suspension units particularly, and only the necessary parts for vehicle height control will be illustrated and described.

Each air-suspension unit S incorporates a strut type shock absorber 1 of the damping force changeover type. The shock absorber 1 has a cylinder joined to a member on the side of the front wheel FA or to a member on the side of the rear wheel BA and a piston fit in the cylinder slidably. The cylinder moves up and down relatively to a piston rod 2 as the corresponding wheel moves up and down. The shock absorber 1 exhibits a damping effect corresponding to the position of a shutter located within the cylinder to absorb shocks effectively.

A main pneumatic spring chamber 3 functioning also as a vehicle height adjusting fluid chamber is provided above the shock absorber 1 coaxially with the piston rod 2. Part of the main pneumatic spring chamber 3 is formed of bellows 4. Therefore, when air is supplied to or discharged from the main pneumatic spring chamber 3, the piston rod 2 is raised or lowered respectively.

Furthermore, an auxiliary pneumatic spring chamber 5 is disposed above the main pneumatic spring chamber 3 coaxially with the piston rod 2.

A spring bearing 6a opening upward is provided on the outer wall of the shock absorber 1 and a spring bearing 6b opening downward is formed in the outer wall of the auxiliary pneumatic spring chamber 5. A coil spring 7 is provided between the spring bearings 6a and 6b.

These pneumatic spring chambers 3 and 5 are interconnected by means of a passage 9 formed through the piston rod 2 and a driving pin 8. A valve 10 forming a spring constant changeover mechanism E is interposed within the passage 9. The valve 10 comprises a first valve unit 10a for interrupting the communication of the auxiliary pneumatic spring chamber 5 with the passage 9 and a second valve unit 10b for interrupting the communication of the main pneumatic spring chamber 3 with the passage 9.

Accordingly, when the valve unit 10a is in the open mode, the main pneumatic spring chamber 3 is allowed to communicate with the auxiliary pneumatic spring chamber 5 by means of the passage 9, so that the spring constant is reduced (soft spring action), whereas when the valve unit 10a is in the closed mode, the communication of the main pneumatic spring chamber 3 with the auxiliary pneumatic spring chamber 5 is interrupted, so that the spring constant is increased (hard spring action).

The valve 10 is controlled to open or close by turning the driving pin 8. The spring chamber capacity can be changed by opening and closing the valve 10.

The spring constant of the suspension can be changed by changing the spring chamber capacity.

The adjustment of the height of the automobile is carried out by means of a system shown in FIG. 2. Compressed air for adjusting the vehicle height is supplied, as shown in FIG. 2, from a compressor 11 serving as a compressed air source through a dryer 12, a joint 13, a rear solenoid valve 14, a front solenoid valve 15, conduits 16 connecting those piping elements and a passage 17 formed in the partly tubular driving pin 8, to each of the suspension units S.

The compressor 11 receives air from an air cleaner 18 and supplies compressed air to the dryer 12. The compressed air is dried by means of a drying agent such as silicagel contained in the dryer 12 and then distributed to the suspension units S as indicated by the solid arrows in FIG. 2. When the compressed air is discharged from the suspension units S, the compressed air is discharged into the atmosphere through an exhaust solenoid valve 19 as indicated by the broken arrows in FIG. 2.

A reserve tank 20 is connected to the dryer 12. Part of the compressed air is supplied from the reserve tank 20 through a supply solenoid valve 21 to each of the suspension units S.

As shown in FIG. 2, vehicle height sensors 22 (the reference numeral "22" indicates a front vehicle height sensor 22F and a rear vehicle height sensor 22R inclusively) are provided. The front vehicle height sensor 22F is attached to the right-hand front lower suspension arm 23 of the automobile to detect the front vehicle height, while the rear vehicle height sensor 22R is attached to the left-hand rear lateral rod 24 of the automobile to detect the rear vehicle height. These vehicle height sensors 22F and 22R supply a front vehicle height detection signal and a rear vehicle height detection signal to a vehicle height control unit 25.

Each of the vehicle height sensors 22F and 22R is provided with a Hall IC and a magnet. Either the Hall IC or the magnet is attached to a member on the side of the front wheel FA or the rear wheel BA and the other is attached to a member on the side of the vehicle body B to detect the deviation of the vehicle height from a normal vehicle height level, a lower vehicle height level and a higher vehicle height level.

A running speed sensor 27 is built in a speed meter 26. The running speed sensor 27 detects the running speed and supplies a detection signal to the vehicle height control unit 25. When the speed meter 26 is of a mechanical type, a reed switch type running speed sensor is employed. When the speed meter 26 is of an electronic type, an open collector output type sensor employing a transistor is used.

An acceleration sensor 28 functioning as a body attitude sensor is provided to detect the variation of the body in attitude. The acceleration sensor 28 detects the variation in the attitude, such as pitching, rolling and yawing, of the body on the springs. For example, when the vehicle is not accelerated, a weight hangs down vertically so that light emitted by a light emission diode is interrupted by a shielding plate and can not reach a photodiode, so that it is detected that the vehicle is not accelerated.

If an accelerative force is applied to the vehicle longitudinally, laterally or vertically, the weight is tilted or moved, so that it is detected how the vehicle is accelerated.

In FIG. 2, a reference numeral 29 indicates solenoid mechanism adapted to be controlled by signals given thereto by the vehicle height control unit 25. The solenoid mechanism 29 has a spring softening solenoid and a spring hardening solenoid. The spring softening solenoid turns the driving pin 8 to a predetermined position to change the mode of the spring from a hard mode to a soft mode. The spring hardening solenoid drives the driving pin 8 in the opposite direction to a predetermined position to change the mode of the spring from the soft mode to the hard mode. In FIG. 2, a broken line LF indicates a boundary between the engine room (a section on the left side of the broken line LF) and the passenger room (a section between the broken line LF and a broken line LR) and the broken line LR indicates a boundary between the passenger room and the trunk room (a section on the right side of the broken line LR). A reference numeral 30 indicates a bumper pad to prevent damaging the wall of the main pneumatic spring chamber 3 when the cylinder of the shock absorber 1 moves relatively to the body while the vehicle is running on a rough road or a bumpy road.

The vehicle height control unit 25 receives vehicle height detection signals from the vehicle height sensors 22 and a running speed detection signal from the running speed sensor 27. The vehicle height control unit is provided with memories for an execution suspension flag, vehicle height flag and vehicle height detecting time setting, a timer and control circuits. The vehicle height control unit 25 adjusts the vehicle height in a short vehicle height judging time or in a long vehicle height judging time as in the conventional system according to the contents of the execution suspension flag and the vehicle height flag.

The functions of the vehicle height control system thus constituted will be described hereinafter in connection with FIGS. 3 and 4. The vehicle height control unit 25 receives momentarily vehicle height signals and running speed detection signals from the vehicle height sensors 22 and the running speed sensor 27 respectively. The vehicle height control unit 25 is designed so that a vehicle height judging time interval while the vehicle is not running (running speed: 3 km/hr or below) is shorter than a vehicle height judging time interval for a running mode in which the vehicle is running at a speed over 3 km/hr, but even while the vehicle is running, if the vehicle height adjusting operation is started at a running speed 3 km/hr or below and completed at the running speed over 3 km/hr, the vehicle height judging time for deciding whether the following vehicle height adjusting operation should be carried out in the same direction as the preceding vehicle height adjusting operation is reduced to a time interval shorter than an ordinary vehicle height judging time interval for the running mode in which the vehicle is running.

Referring now to FIG. 3, while the vehicle speed is 3 km/hr or below, the vehicle height control unit 25 starts vehicle height raising control as indicated by Ha on the basis of a vehicle height detection signal at a time $t_1$ after a time corresponding to the vehicle height judging time interval has elapsed since a time $t_0$ when the vehicle height was lowered due to the boarding of passengers.

In FIG. 3, while the vehicle speed is 3 km/hr or below, the vehicle height doesn't reach a standard height Hst yet. And subsequently the vehicle speed exceeds 3 km/hr due to the starting acceleration and only the front side of the body is raised due to the inertia at the time of acceleration and hence only the height of the front side reaches the standard vehicle height Hst (referring to the vehicle height at $t_2$), then the vehicle height adjusting operation is interrupted.

Then, gear changing operation is performed and acceleration is reduced gradually. After the starting and accleration mode has been terminated, only the height of the front side diminishes at a time $t_3$ to a lower height which was attained during the preceding vehicle height adjusting operation. In this state, as the vehicle height judging time for deciding whether the next vehicle height adjustment should be started is changed to a reduced vehicle height judging time ts, a vehicle height raising control is started again at a time $t_4$ after a time period corresponding to the reduced vehicle height judging time ts from the time $t_3$ as indicated by Hc in FIG. 3. This second vehicle height raising control is continued until the standard vehicle height Hst is attained.

Thus the vehicle height judging time for deciding whether the next vehicle height adjusting operation should be started is reduced and after the completion of the second vehicle height adjusting operation in the same direction (raising or lowering) as the preceding vehicle height adjusting operation at a time $t_5$, the vehicle height judging time interval is increased to the ordinary vehicle height judging time interval. In FIG. 3, a symbol Hb represents a height of the front side of the body, exceeding the standard vehicle height (normal vehicle height) attained during the accelerated running mode.

When vehicle height control is started while the running speed is 3 km/hr or below and is completed before the running speed exceeds 3 km/hr, the vehicle height judging time interval is not reduced and is maintained at the ordinary vehicle height judging time interval for the running mode in which the running speed is 3 km/hr or below. When the vehicle height control is started while the vehicle is running at a speed over 3 km/hr, the vehicle height judging interval is the same as the ordinary vehicle height judging time interval for the running mode in which the running speed is over 3 km/hr. This vehicle height control is performed successively or only once after the ignition key has been turned on. The vehicle height judging time intervals may be, by way of example, 1.5 sec for a reduced time interval, 10 sec for a running mode of 3 km/hr or below running speed and 20 sec for a running mode of over 3 km/hr running speed, or 4.5 sec for a reduced time interval, 13 sec for a running mode of 3 km/hr or below running speed and 30 sec for a running mode of over 3 km/hr running speed.

Figure 4:
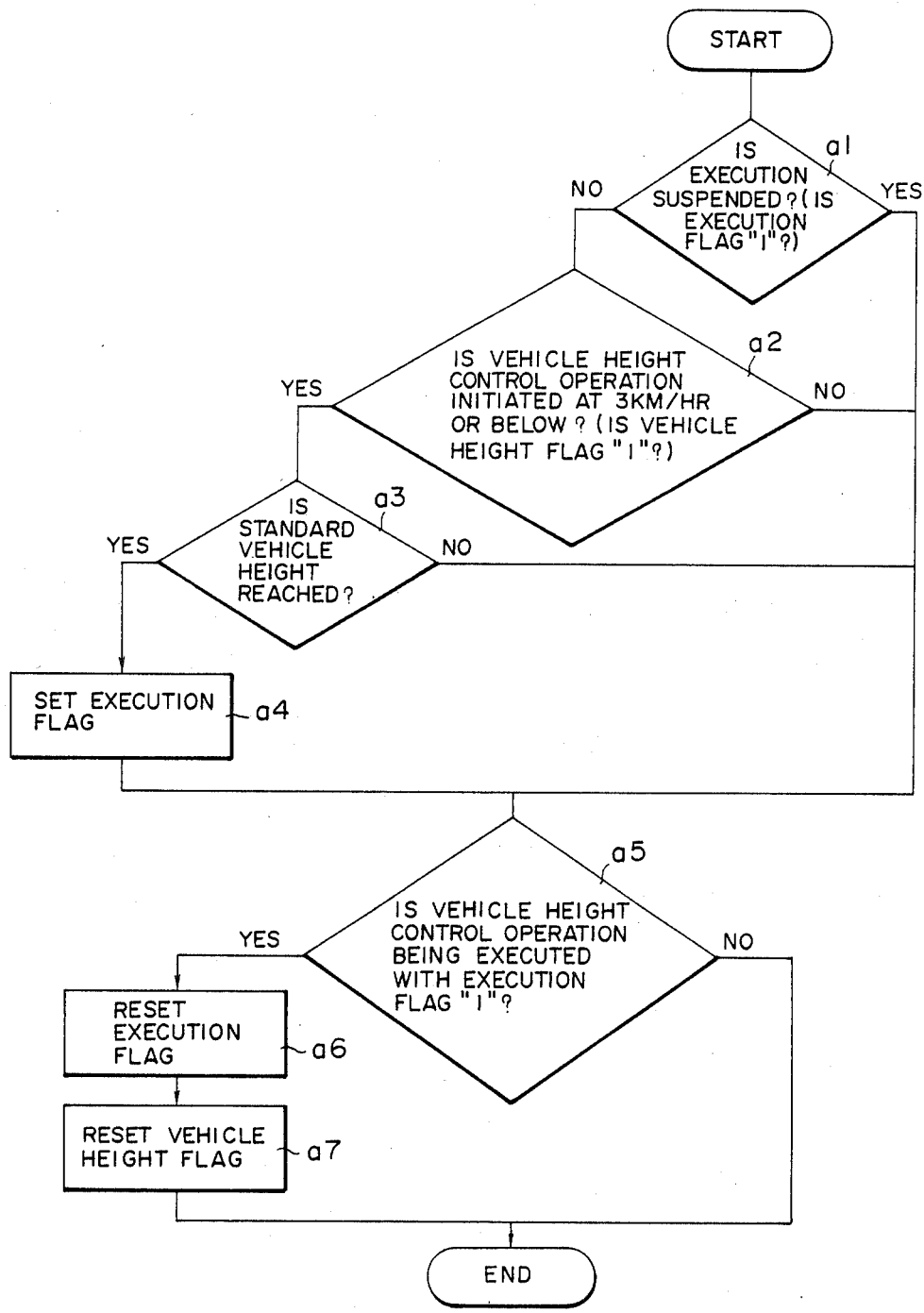
FIG. 4 is a flow chart showing the functions of the vehicle height control system according to the present invention.

The manner of such a series of control operations will be described hereinafter in connection with a flow chart as shown in FIG. 4. An execution flag, which will be described later, becomes "1" when vehicle height control is started at a running speed 3 km/hr or below and is completed at a running speed over 3 km/hr. More concretely, the vehicle height control unit 25 decides, while the vehicle is running at a speed over 3 km/hr, on the basis of a start command, whether or not the control mode is in an execution suspension mode (in course of the vehicle height adjusting operation), namely, whether or not the execution flag is "1".

When the execution flag is "1", the decision is "YES" and the vehicle height judging time interval is reduced. When the vehicle height control in the same direction of adjustment as the suspended vehicle height control has once been started on the basis of the reduced vehicle height judging time interval, the same vehicle height control is continued until the vehicle height reaches the standard vehicle height. Therefore, after the standard vehicle height has been attained, the vehicle height judging time interval need not be shortened, and hence if the decision at a step a5 is "YES", that is, if a decision is made that the execution flag is "1" and vehicle height control is being executed, the execution flag and the vehicle height flag is reset and the vehicle height judging time interval is extended to the ordinary time interval at steps a6 and a7.

Figure 6B:
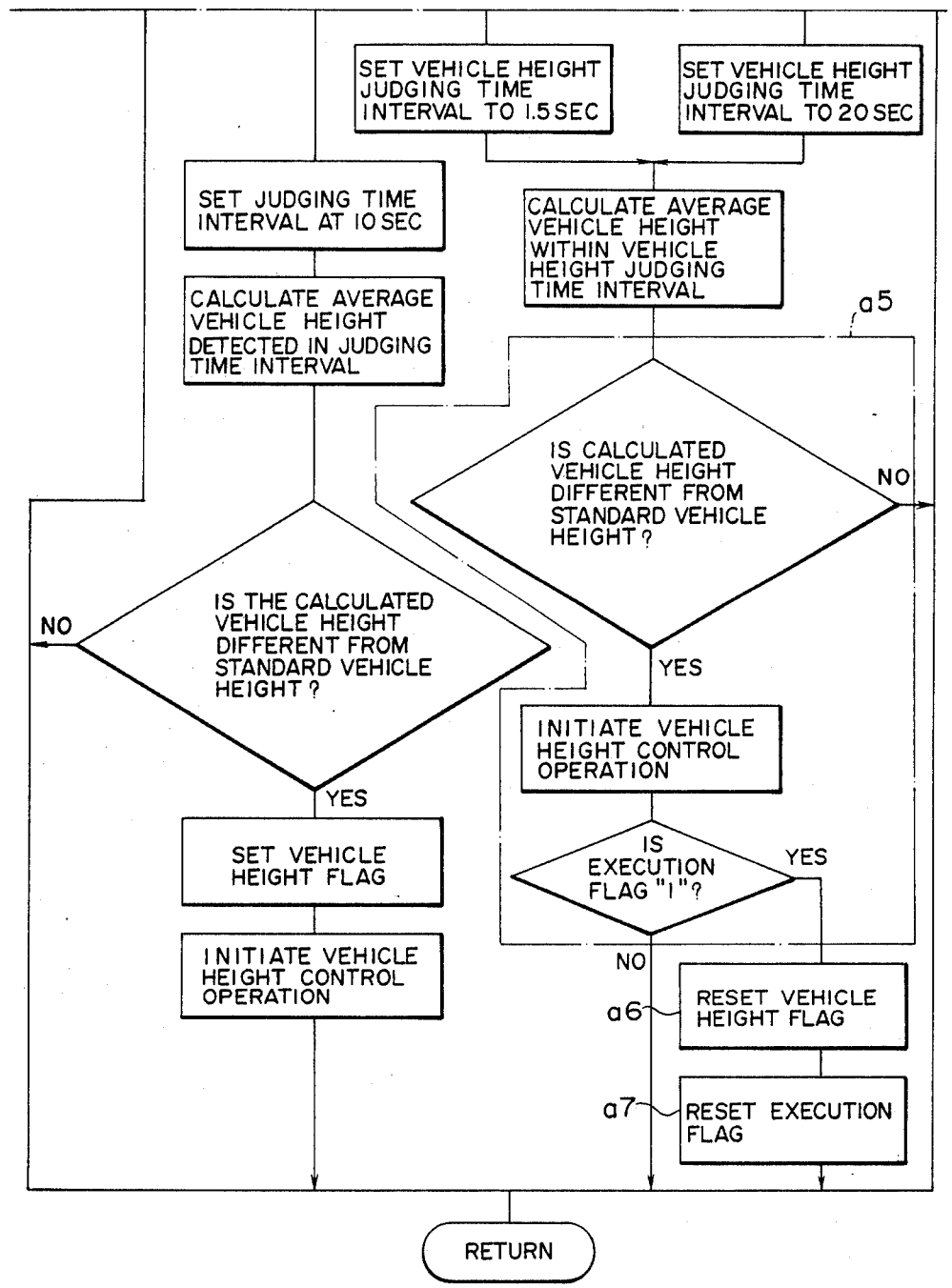

If a running speed detecting signal received by the vehicle height control unit 25 indicates that the running speed is 3 km/hr or below and if the vehicle height is not equal to the standard vehicle height Hst, vehicle height control operation is started and a vehicle height flag "1" is attached to the flag memory. When the decision at the step a1 is "NO" while the running speed is over 3 km/hr, that is, when execution is not being suspended, a decision is made whether or not the vehicle height flag "1" is attached at a step a2, to decide whether or not the vehicle height control operation has been started at a running speed 3 km/hr or below. If the vehicle height flag "1" is attached, a decision is made at a step a3 whether or not the vehicle height has reached the standard vehicle height Hst. If the decision at the step a3 is "YES", namely, if the vehicle height has reached the standard vehicle height Hst, the vehicle height control operation is terminated and execution flag is set at a step a4 to establish the execution suspension mode so that the vehicle height judging time interval is shortened. If the vehicle height flag is not "1" at the step a2 or a decision is made at the step a3 that the vehicle height has not yet reached the standard vehicle height Hst, the execution flag is not "1". Consequently, the decision at the next step a5 is "NO" and the control sequence is returned to "START" again. The details of the above-mentioned control sequence are shown in FIG. 6.

A vehicle height control signal given by the vehicle height control unit 25 is supplied to the compressor 11 and only to those valves among the solenoid valves 14, 15, 19 and 20, which are required to be opened, to open the valves. Consequently, the fluid is supplied to or discharged from the suspension units S to control the vehicle height.

Figure 5:
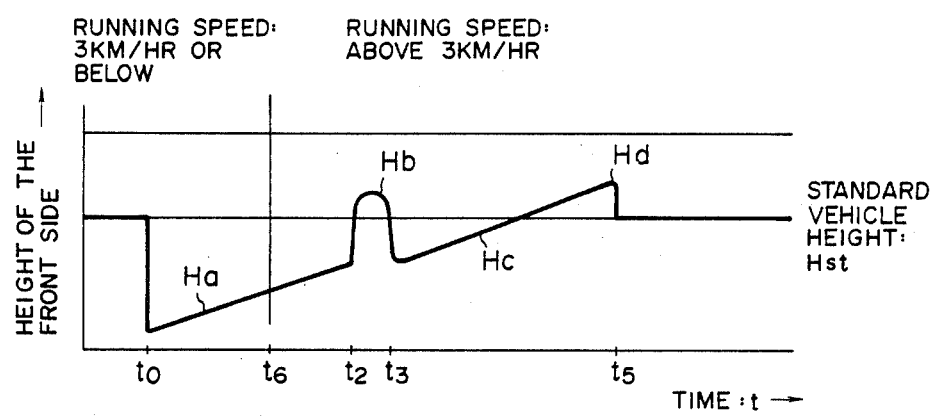
FIG. 5 is a timing diagram for another vehicle height control system embodying the present invention.

FIG. 5 is a timing chart similar to FIG. 3, showing the control timing of another embodiment of the present invention, wherein like reference characters designate like or corresponding matters through FIGS. 3 and 5.

In this embodiment, when the vehicle height control operation is started while the vehicle is running at a speed 3 km/hr or below and the standard vehicle height Hst is reached while the vehicle is running at a speed over 3 km/hr, a decision is made, on the basis of the average of vehicle heights during the time of N times an interval of 1.5 sec from a time $t_6$ when the running speed exceeds 3 km/hr, whether or not the standard vehicle height has been reached. The value of N is determined selectively so that the vehicle height control operation which has already been started and being presently executed will not be interrupted, even if the front side of the body is raised due to acceleration for a short period of time (a period of time between a time $t_2$ and $t_3$). In such a case, since a decision is made to interrupt the vehicle height control operation on the basis of the average height, actually, the vehicle height control operation is interrupted after the vehicle height has exceeded the standard vehicle height Hst (a vehicle height Hd in FIG. 5). When the vehicle height control operation is started while the vehicle is running at a speed 3 km/hr or below and is completed while the vehicle is running at a speed also 3 km/hr or below, the vehicle height control operation is interrupted immediately after the standard vehicle height has been reached in the same manner as the conventional manner. When the vehicle height control operation is started while the vehicle is running at a speed over 3 km/hr, the manner of control operation is the same as the conventional manner of control operation. Accordingly, in this embodiment, when the vehicle height control operation which has been started while the vehicle is running at a speed 3 km/hr or below is to be terminated while the vehicle is running at a speed over 3 km/hr, the next vehicle height control operation can be started after a vehicle height judging time period which is shorter than the normal vehicle height judging time in ordinary running.

Although the reference running speed for the vehicle height control operation is 3 km/hr in the above description of the preferred embodiments, naturally, the reference running speed is not limited thereto and any suitable reference running speed may be employed.

What is claimed is:

1. A vehicle height control system comprising:
   hydraulic suspension units interposed between the members on the side of the wheels and the members on the side of the body of a vehicle respectively and each having fluid chambers for vehicle height adjustment;
   a running speed sensor for detecting the running speed of the vehicle;
   a vehicle height sensor for detecting the height of the vehicle;
   vehicle height control operation initiating device adapted to receive detection signals from said running speed sensor and said vehicle height sensor, to set a vehicle height judging time interval for determining the initiation of vehicle height control operation when the running speed of the vehicle is higher than a set value longer than a vehicle height judging time interval for determining the initiation of vehicle height control operation when the running speed of the vehicle is the set value or lower than that, and to give a signal for initiating vehicle height control operation to adjust the vehicle height to a standard vehicle height if the vehicle height detected in the set vehicle height judging time interval is different from said standard vehicle height;
   vehicle height control operation stopping device adapted to receive detection signals from said vehicle height sensor and to stop the vehicle height control operation immediately after the standard vehicle height has been reached;
   hydraulic control device for controlling the pressure in the fluid chambers of said suspension unit on the basis of the output signals of said vehicle height control operation initiating device and said vehicle height control operation stopping device; and
   vehicle height control operation initiating timing advancing device which, when the preceding vehicle height control operation is started while the vehicle is running at a speed of the set value or below and the same is completed while the vehicle is running at a speed over the set value, gives a next vehicle height control operation initiating signal to said hydraulic control device after a time which is shorter than said vehicle height judging time interval for a running mode in which the vehicle is running at a speed over the set value has elapsed.

2. A vehicle height control system according to claim 1, wherein said vehicle height control operation initiating timing advancing device sets in said vehicle height control operation initiating device a reduced vehicle height judging time interval which is shorter than said vehicle height judging time interval, when vehicle height control operation which has been initiated while the vehicle is running at a speed of the set value or below is completed while the vehicle is running at a speed over the set value.

3. A vehicle height control system according to claim 2, wherein said vehicle height control operation initiating timing advancing device maintains to set in said vehicle height control operating initiating device said reduced vehicle height judging time interval until vehicle height control operation is restarted after the vehicle height control operation initiated while the vehicle is running at a speed of said set value or below has been completed while the vehicle is running at a speed over said set value, and thereafter restores the setting of the vehicle height control operation initiating device to a setting for the ordinary vehicle height judging time interval.

4. A vehicle height control system according to claim 2, wherein said vehicle height control operation initiating timing advancing device maintains to set in said vehicle height control operation initiating device said reduced vehicle height judging time interval until vehicle height control operation for adjusting the vehicle height in the same direction as the preceding vehicle height control operation is restarted after the preceding vehicle height control operation initiated while the vehicle is running at a speed of said set value or below has been completed while the vehicle is running at a speed over said set value, and thereafter restores the setting of said vehicle height control operation initiating device to a setting for the ordinary vehicle height judging time interval.

5. A vehicle height control system according to claim 2, wherein said vehicle height control operation initiating timing advancing device controls said vehicle height control operation stopping device, when vehicle height control operation initiated while the vehicle is running at a speed of said set value or below has not yet been completed by a time when the running speed of the vehicle exceeds said set value, so as to make said vehicle height control operation stopping device give a signal to stop the vehicle height control operation only when the average height of the vehicle determined within a set time period reaches the standard vehicle height.

6. A vehicle height control system according to claim 5, wherein said set time period is determined selectively so that a signal to stop vehicle height control operation will not be given even if the vehicle height varies due to acceleration or deceleration during the running of the vehicle.

* * * * *